(No Model.)  3 Sheets—Sheet 1.

W. H. H. STEVENSON.
CAN SOLDERING MACHINE.

No. 325,130. Patented Aug. 25, 1885.

WITNESSES:

INVENTOR:
Wm. H. H. Stevenson
By G. A. Boyden
Attorney.

(No Model.)　　　　　W. H. H. STEVENSON.　　　3 Sheets—Sheet 2.
CAN SOLDERING MACHINE.
No. 325,130.　　　　　　　　　Patented Aug. 25, 1885.
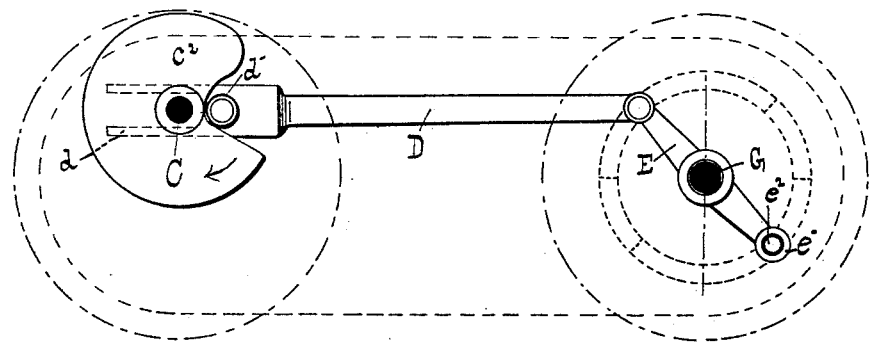
Fig. 3.
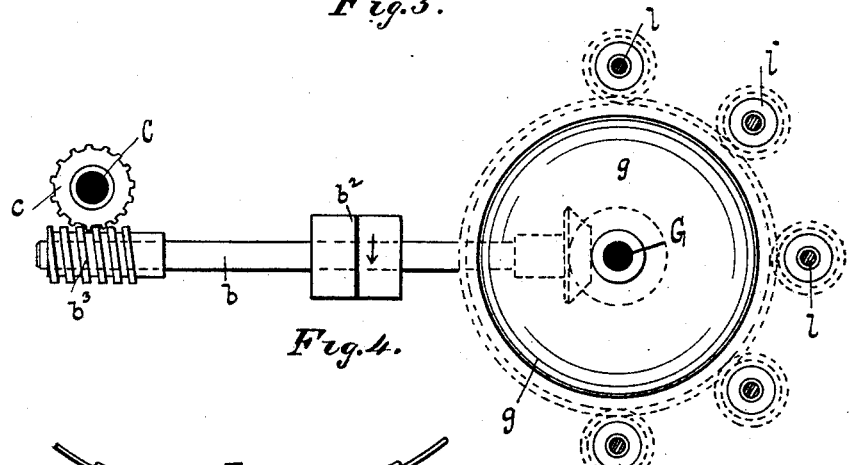
Fig. 4.
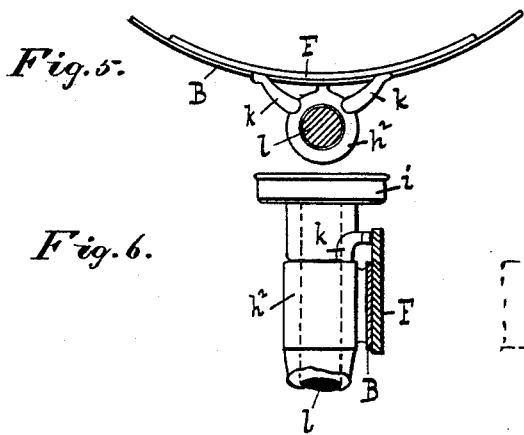
Fig. 5.
Fig. 6.
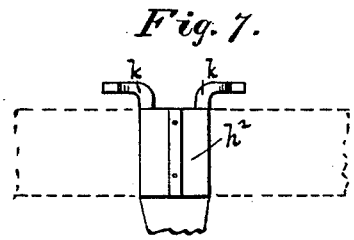
Fig. 7.
WITNESSES:　　　　　　　　　　　　　INVENTOR:
Benj. V. Boyden.　　　　　　　　　　Wm. H. H. Stevenson
Wilson Ringle　　　　　　　　　By　G. A. Boyden
　　　　　　　　　　　　　　　　　　　　　Attorney.

(No Model.)  3 Sheets—Sheet 3.

W. H. H. STEVENSON.
CAN SOLDERING MACHINE.

No. 325,130.  Patented Aug. 25, 1885.

WITNESSES:
Benj. F. Boyden
Wilson Ringle

INVENTOR:
Wm. H. H. Stevenson
By G. A. Boyden
Attorney.

United States Patent Office.

WILLIAM H. H. STEVENSON, OF BALTIMORE, MARYLAND.

CAN-SOLDERING MACHINE.

SPECIFICATION forming part of Letters Patent No. 325,130, dated August 25, 1885.

Application filed January 10, 1885. (No model.)

*To all whom it may concern:*

Be it known that I, WILLIAM H. H. STEVENSON, a citizen of the United States, residing at Baltimore, in the State of Maryland, have invented certain new and useful Improvements in Can-Soldering Machines, of which the following is a specification, reference being had to the accompanying drawings.

My invention relates to improvements in can-soldering machines in which the bottom and top or end seams of the cans are soldered; and it has for its objects an endless band arranged to support and convey can-holders, means to give the said band an intermittent movement, and mechanism to apply the solder. I accomplish these objects by mechanism illustrated in the accompanying drawings, in which—

Figure 1:
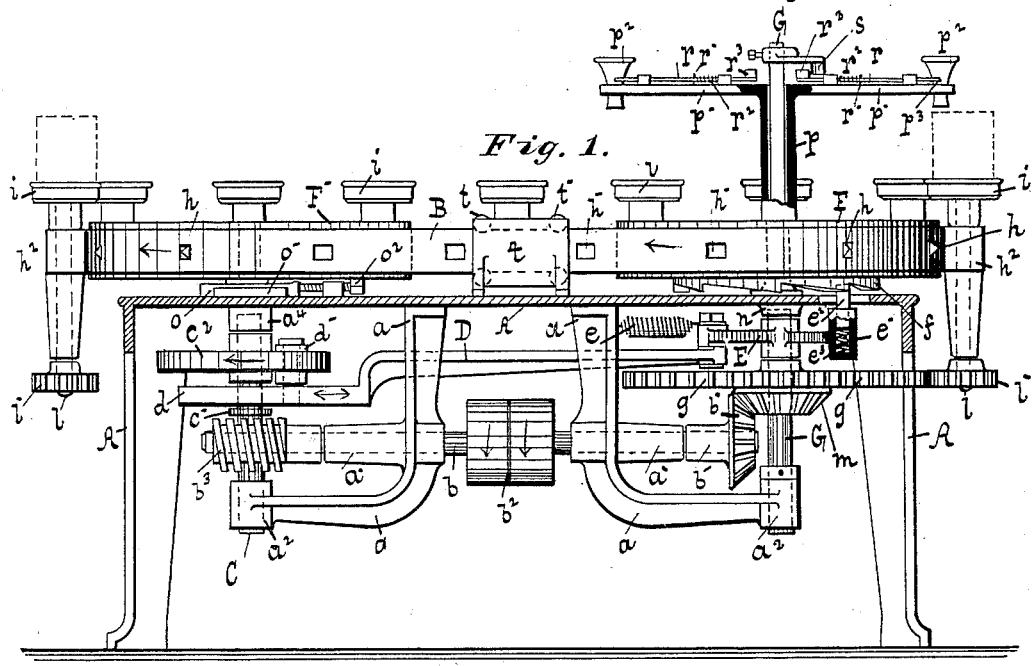
Figure 2:
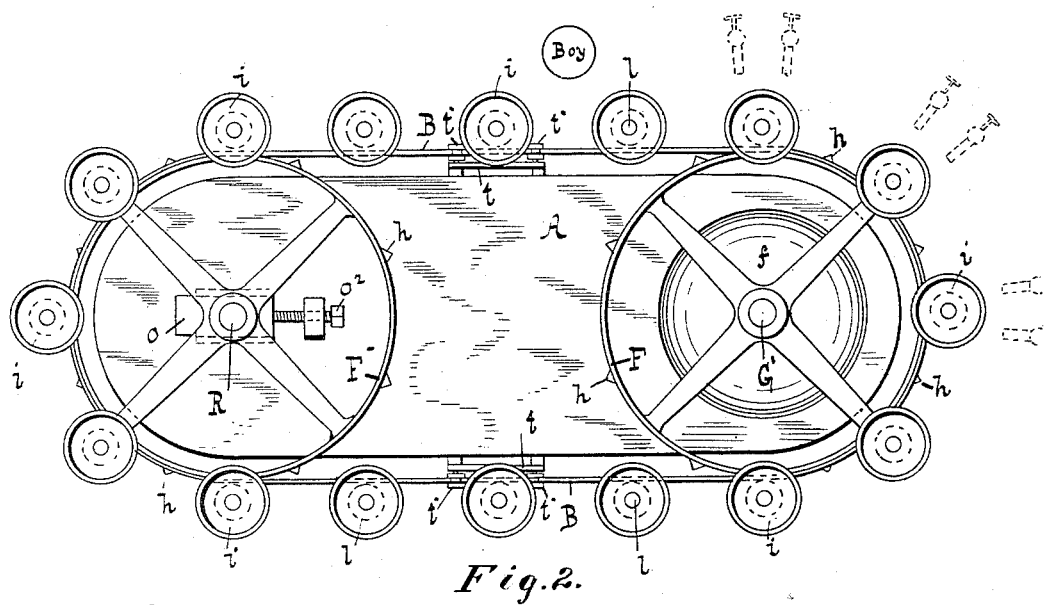
Figure 8:
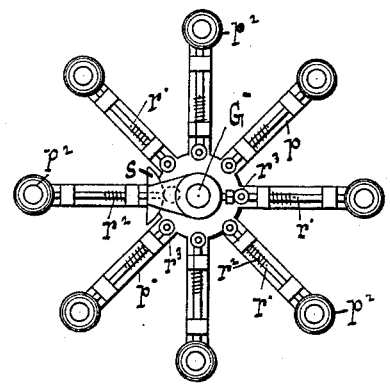
Figure 9:
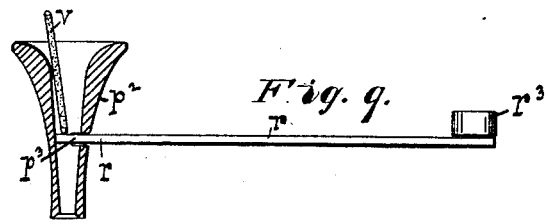
Figure 10:
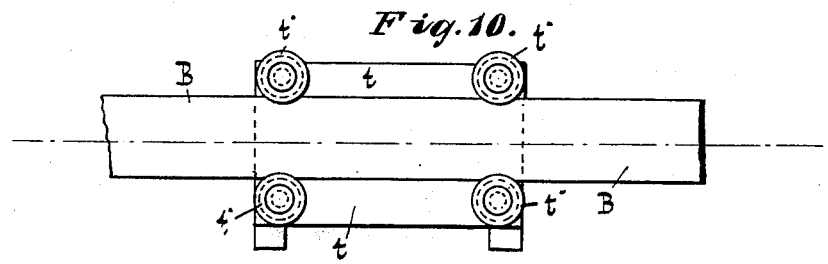
Figure 11:
Figure 12:
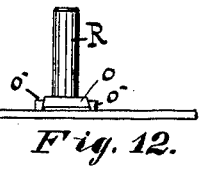

Figure 1 is a side view with the frame in section; Fig. 2, a top view of the machine with the solder-applying device removed; Figs. 3 and 4, top views of the mechanism under the frame on different planes; Figs. 5, 6, and 7, detail views of the bearings which carry the can-seats; Fig. 8, top view of the solder-applying device; Fig. 9, enlarged detail view of the solder tube and valve; Figs. 10 and 11, enlarged detail views of the band-supporting device, and Fig. 12, a view showing the adjustable bearing of the band-wheel.

Similar letters refer to similar parts throughout the several views.

The letter A designates the frame, above and upon which the endless band B moves with the driving mechanism supported under its top, thereby protecting the same from the rosin, &c.

To the under side of the frame-top are attached the arms $a$, which are provided with bearings $a'$ and $a^2$. In the bearings $a'$ runs the horizontal shaft $b$, provided with the bevel gear-wheel $b'$ at one end, in the center with the driving-pulleys $b^2$, and at the other end with a screw, $b^3$, which engages with a corresponding wheel, $c$, on the vertical shaft C.

The vertical shaft C revolves in and is supported by the bearings $a^3$ and $a^4$, and is provided with the wheel $c$, the collar $c'$, which supports the connecting-rod D, and the cam $c^2$, which moves the rod D forward. The connecting-rod D is formed with a yoke, $d$, at one end, (see Fig. 3,) which yoke embraces the shaft C, and thereby forms a guide, and is supported by resting on the collar $c'$, and provided with a roller, $d'$, which engages with the cam $c^2$, with the end opposite thereto secured to the rock-arm E.

The rock-arm E, which vibrates from the shaft G, has one end attached to the spring $e$, and the other end provided with a pocket, $e'$, in which is a pin, $e^2$, and a spring, $e^3$. The pin $e^2$ engages with the teeth of the ratchet $f$ on the band-wheel F.

The band-wheel F, which carries the band B, revolves loosely around the trunnion G', and is provided with the ratchet $f$ and spurs $h$, which support and hold the band to its place. The corresponding wheel F' is like the wheel F, except it has no ratchet, and revolves around an adjustable bearing, R, which consists of a base, $o$, sliding between two projections, $o'$, with a screw, $o^2$, threaded in a projection on the frame A, whereby any desired tension may be given to the band.

The endless band B may be of any flexible material, (steel preferable,) and is provided with holes $h'$ for the spindles of the can-holders, and the bearings $h^2$. These bearings consist of downwardly-projecting sleeves, which form long bearings and are provided with two arms, $k$, (see Figs. 5, 6, and 7,) which project outwardly and above the band B, resting against the band-wheels F and F', thereby steadying the bearings when in contact with the said wheels, at which place the heat and solder are applied.

The can-holders $i$ are disks which are provided with annular depressions, in which the cans are set, and attached to the spindles $l$, which spindles are provided with gear-wheels $l'$, that engage with the master-wheel $g$, which is secured to the shaft G, the latter revolving in the bearings $a^5$ and $n$, and provided with a bevel gear-wheel, $m$, which engages with the wheel $b'$.

The solder-applying device is attached rigidly to the wheel F, and revolves therewith around the trunnion G', which is secured to the frame A, and consists of a sleeve, $p$, provided with eight radial arms, $p'$, corresponding in position with the can-holders $i$, with each arm provided with a tube, $p^2$, in which is a gate, $p^3$, consisting of a rod, $r$, provided with a pin, $r'$, a spring, $r^2$, and a roller, $r^3$, which draws the gate back by coming in contact with the cam $s$ attached to the trunnion G', and set in a position to open the gate $p^3$ at the desired place where the solder is to be dropped on the can.

To the frame A are attached projections $t$, which carry a series of grooved rollers, $t'$, in which grooves runs the band B, thereby steadying the same.

The operation is as follows: The power is applied to the pulley $b^2$, which rotates the shaft $b$, the latter operating the vertical shaft C by means of the screw $b^3$ and wheel $c$, and actuating the cam $c^2$ thereon, which moves the rod D forward by coming in contact with the roller $d'$ as it rotates, and is there held until about three-fourths of a revolution is made, and then drawn back by the spring $e$, thereby vibrating the rock-arm E, which is provided with a pawl, $e^2$, that engages with the ratchet-teeth on the wheel F, and thereby communicating an intermittent movement to the said wheel as the arm E vibrates, and the endless flexible band B, secured to the wheel F, is moved likewise, thereby permitting the cans to remain in the flame from the burners a certain time (said burners may be placed at any desired point around the wheel F, as shown by dotted lines, Fig. 2, and any number may be used) and then pass on out of the same to cool before removing, the can-holders $i$ being revolved by the wheels $l'$ attached thereto engaging with the master-wheel $g$, when brought in contact therewith by the band B passing around the wheel F.

In operating the machine a boy stands on the side the burners are on, near the wheel F, and places the cans in the holders $i$, which are conveyed to the heat as the band B intermittingly moves forward, and pauses with the cans opposite the burners, thereby gradually heating them before the solder is applied, which is when the can has reached the last set of burners by the roller $r^3$ coming in contact with the cam $s$, which draws back the gate $p^3$ and permits the wire solder V (see Fig. 9) to drop on the can, which is there fused, the drop of solder being placed in the tube by the boy when he places a can. After the cans are soldered they pass around, and in so doing are cooled sufficiently to be removed by the feed-boy at that point.

Having fully described my invention, what I claim, and wish to secure by United States Letters Patent, is—

1. In a can-soldering machine, the combination of a flexible band, B, provided with can-holders, and the wheels F and F', as herein set forth.

2. In a can-soldering machine, the wheel F, having rigidly attached thereto solder-applying devices, in combination with the can-holders $i$ and means for rotating the wheel and moving the can-holder, whereby a solder-applying device and a can-holder are successively brought together, as herein specified.

3. In a can-soldering machine, the wheels F and F', and the endless band B, provided with can-holders $i$, in combination with the wheels $l'$ and the master gear-wheel $g$, whereby two or more cans may be revolved at one time.

4. In a can-soldering machine, an endless flexible band provided with can-holders and means for moving the band, as herein specified.

5. The combination of the wheels F and F', the flexible band B, provided with can-holders, and the support $t$, for the purpose as herein specified.

6. The combination of the ratchet $f$, the rock-arm E, provided with a spring-pawl, the connecting-rod D, the cam $c^2$, the shaft C, provided with a pin and roller, the spring $e$, and the upper wheel carrying the can-soldering devices.

7. The combination of the ratchet $f$, the rock-arm E, provided with a spring-pawl, the connecting-rod D, the cam $c^2$, the shaft C, provided with a pin and roller, the spring $e$, and the endless band carrying the can-holders.

8. The combination of the ratchet $f$, the rock-arm E, provided with a spring-pawl, the connecting-rod D, the cam $c^2$, the shaft C, provided with a pin and roller, the spring $e$, the endless band carrying the can holder, and the wheel carrying the solder-applying devices.

In testimony whereof I affix my signature in presence of two witnesses.

WILLIAM H. H. STEVENSON.

Witnesses:
M. H. PLUNKETT,
WM. B. NELSON.